(12) United States Patent
Gong

(10) Patent No.: US 12,326,524 B2
(45) Date of Patent: Jun. 10, 2025

(54) LIDAR DEVICE AND RANGING ADJUSTMENT METHOD

(71) Applicant: SUTENG INNOVATION TECHNOLOGY CO., LTD., Shenzhen (CN)

(72) Inventor: Changsheng Gong, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/801,597

(22) Filed: Aug. 12, 2024

(65) Prior Publication Data

US 2025/0060462 A1    Feb. 20, 2025

(51) Int. Cl.
| G01S 7/487 | (2006.01) |
| G01S 7/481 | (2006.01) |
| G01S 7/497 | (2006.01) |
| G01S 17/10 | (2020.01) |

(52) U.S. Cl.
CPC ............ *G01S 7/487* (2013.01); *G01S 7/4814* (2013.01); *G01S 7/4816* (2013.01); *G01S 7/497* (2013.01); *G01S 17/10* (2013.01)

(58) Field of Classification Search
CPC ...... G01S 7/487; G01S 7/4814; G01S 7/4816; G01S 7/497; G01S 17/10
See application file for complete search history.

(56) References Cited

U.S. PATENT DOCUMENTS

2021/0263137 A1\* 8/2021 Dehlinger ............... G01S 17/26

FOREIGN PATENT DOCUMENTS

| CN | 111856434 A | 10/2020 |
| WO | 2021189439 A1 | 9/2021 |

OTHER PUBLICATIONS

First Office Action issued in related Chinese Application No. 202311036417.9, mailed Sep. 22, 2023, 21 pages.
Second Office Action issued in related Chinese Application No. 202311036417.9, mailed Oct. 18, 2023, 10 pages.

\* cited by examiner

*Primary Examiner* — Isam A Alsomiri
*Assistant Examiner* — Sanjida Naser
(74) *Attorney, Agent, or Firm* — BAYES PLLC

(57) ABSTRACT

The present disclosure provides a LiDAR device and its ranging adjustment method. The ranging adjustment method involves first calibrating the echo intensities at different pixel positions in receiving units of the LiDAR device and then determining the corresponding correction coefficients. Based on these correction coefficients, the method corrects the intensity data output by the pixels at different positions, ensuring consistency in the intensity data output by the corresponding pixels of the same receiving unit.

8 Claims, 12 Drawing Sheets

FIG. 2

S10 — Calibrating echo intensity at different pixel positions in the receiving unit, and determining a correction coefficient of the pixel at different positions in the receiving unit based on the echo intensity S20 — When a preset-position receiving unit receives an echo, performing echo intensity correction calculation based on the correction coefficient of the pixel at different positions in the preset-position receiving unit, to obtain correction intensity data corresponding to the pixel at different positions in the preset-position receiving unit S30 — Determining distance information of the to-be-measured object based on the correction intensity data

FIG. 4

Performing multiple calibrations on echo intensity at different pixel positions in the preset-position receiving unit using reflectors with different calibration reflectivity, to obtain correction coefficients of the pixel at different positions in the preset-position receiving unit under different reflectivity ⟋ S11

Performing linear interpolation calculation on the correction coefficients of the pixel at different positions under different reflectivity, to obtain the actual correction coefficient of the pixel at different positions in the preset-position receiving unit under different reflectivity ⟋ S12

LIDAR DEVICE AND RANGING ADJUSTMENT METHOD

CROSS-REFERENCE TO RELATED APPLICATION

The present application claims the benefit of priority to Chinese Patent Application No. 202311036417.9, filed on Aug. 17, 2023, which is hereby incorporated by reference in its entirety.

TECHNICAL FIELD

The present application relates to the technical field of LiDAR, particularly to a LiDAR device and its ranging adjustment method.

TECHNICAL BACKGROUND

A laser receiving module typically includes receiving units arranged in an array, with each receiving unit including a pixel array. When the laser spot of the emission unit irradiates one of the receiving units, it often results in stronger energy at the central pixels of a receiving unit and relatively weaker energy at the edge pixels. This causes a noticeable intensity drop at the edge pixels of adjacent receiving units, affecting the ranging accuracy. Adjusting the emission unit's power to control the intensity of different pixels in the receiving unit is not feasible.

SUMMARY

Embodiments of this application disclose a ranging adjustment method for a LiDAR device to address the issue of different light intensities at different pixel positions in the receiving unit of traditional LiDAR devices, which improves the accuracy of ranging.

In a first aspect of the embodiments of the present application, a ranging adjustment method for a LiDAR device is disclosed. The LiDAR device includes a laser emission module and a laser receiving module, the laser receiving module including receiving units arranged in an array, and the receiving unit including a plurality of pixels. The ranging adjustment method includes: calibrating echo intensity at different pixel positions in the receiving unit, and determining a correction coefficient of the pixel at different positions in the receiving unit based on the echo intensity; when a preset-position receiving unit receives an echo, performing echo intensity correction calculation based on the correction coefficient of the pixel at different positions in the preset-position receiving unit, to obtain correction intensity data corresponding to the pixel at different positions in the preset-position receiving unit; determining distance information of a to-be-measured object based on the correction intensity data.

In an embodiment, before calibrating echo intensity at different pixel positions in the receiving unit, determining a correction coefficient of the pixel at different positions in the receiving unit based on the echo intensity, the method includes: obtaining a position of a receiving unit receiving an echo within the receiving array; when the receiving unit is at a preset position, performing calibration on the receiving unit.

In an embodiment, calibrating echo intensity at different pixel positions in the receiving unit, determining the correction coefficient of the pixel at different positions in the receiving unit based on the echo intensity includes: performing multiple calibrations on echo intensity at different pixel positions in the preset-position receiving unit using a reflector with different calibration reflectivity, to obtain different correction coefficients of the pixel at the different positions in the preset-position receiving unit under the different reflectivity; and performing linear interpolation calculation on the correction coefficients of the pixel at the different positions, to obtain an actual correction coefficient of the pixel at the different positions in the preset-position receiving unit under the different reflectivity.

In an embodiment, after performing echo intensity correction calculation based on the correction coefficient of the pixel at different positions in the preset-position receiving unit, to obtain the correction intensity data corresponding to the pixel at different positions in the preset-position receiving unit, the method includes: performing intensity filtering on and outputting correction intensity data of a reference pixel in the adjacent receiving unit, and determining the distance information of the to-be-measured object based on the correction echo intensity data after filtering.

In an embodiment, performing intensity filtering on the correction intensity data of the reference pixel in the adjacent receiving unit includes: receiving echo intensity information of the reference pixel in the adjacent receiving unit; and performing filtering on the echo data of the reference pixel in the adjacent receiving unit.

In an embodiment, the reference pixel includes a plurality of columns or rows of pixels corresponding to a central region of the adjacent two receiving units.

In a second aspect of the embodiments of the present application, a LiDAR device is disclosed, includes a laser emission module, a laser receiving module, and a control circuit connected to the laser emission module and the laser receiving module. The control circuit includes a drive conversion circuit, a memory, a processor, and a computer program stored in the memory and executable on the processor, and the processor performs steps of the ranging adjustment method as described above when driving the drive conversion circuit; the laser receiving module includes a plurality of receiving units arranged in an array, and the laser emission module includes a single emission unit or a plurality of emission units arranged in an array.

In an embodiment, the emission unit includes a laser, and the laser emission module includes an emission lens provided corresponding to the laser; the receiving unit includes a plurality of pixels arranged in an array, and the laser receiving module includes at least one receiving lens provided corresponding to the array of pixels.

In an embodiment, the drive conversion circuit includes laser drive circuits connected to the processor and the laser emission module respectively, the laser drive circuits are turned on or off according to a control signal output by the processor, and adjust the quantity of times of laser emission and/or emission power of the emission unit in a frame of a scanning image; a signal conversion circuit connected to the laser receiving module and the processor respectively, the signal conversion circuit is configured to convert a current signal output by the receiving unit into a corresponding echo pulse signal, and output the echo pulse signal to the processor.

In an embodiment, the pixel includes a photoelectric conversion diode.

The ranging adjustment method for the LiDAR device first calibrates the echo intensity at different pixel positions in the receiving unit and the corresponding correction coefficients, and then corrects the intensity data output by the pixels at different positions based on the correction coefficients. This ensures consistency in the intensity data output by the corresponding pixels of the same receiving unit and determines the distance information of the to-be-measured object based on the corrected intensity data, thereby improving the ranging accuracy.

BRIEF DESCRIPTION OF DRAWINGS

FIG. 2 shows a schematic structure of a receiving unit in accordance with some embodiments of the present application;

FIG. 4 shows a schematic flow of the first ranging adjustment method for the LiDAR device in accordance with some embodiments of the present application;

FIG. 6 shows a flowchart of step S10 in the ranging adjustment method shown in FIG. 4;

FIG. 10 shows a schematic structure of the filtering process in the ranging adjustment method in accordance with some embodiments of the present application;

DETAILED DESCRIPTION

The following provides a detailed description of the application in conjunction with the accompanying drawings and embodiments.

The terms "first" and "second" are used for descriptive purposes and should not be understood as indicating relative importance or implying the number of indicated technical features. Thus, features defined as "first" and "second" may explicitly or implicitly include one or more of these features. "multiple" means two or more unless otherwise specified.

Figure 1:
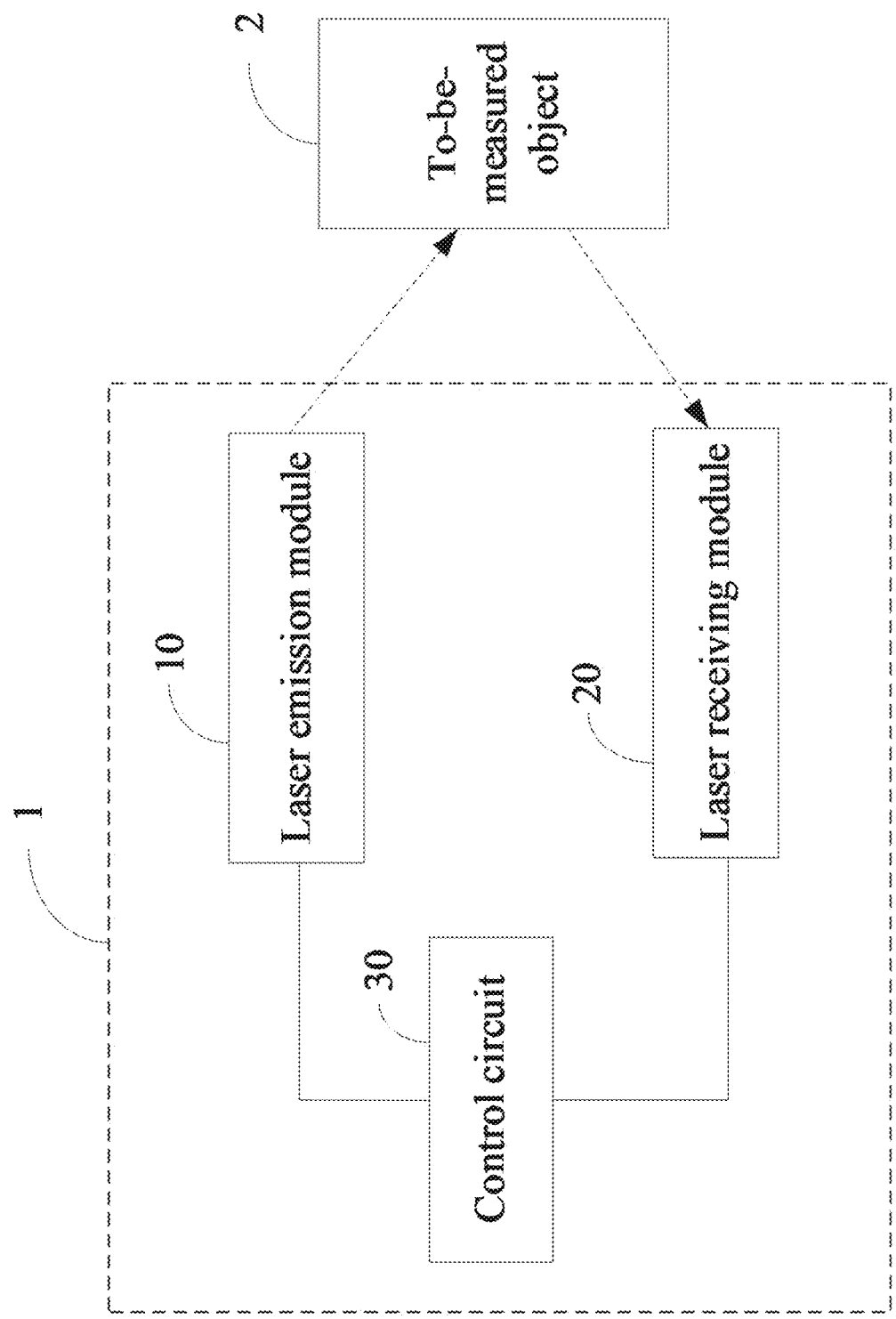
FIG. 1 shows a schematic structure of the first type of LiDAR device in accordance with some embodiments of the present application.

A first aspect of the embodiments discloses a ranging adjustment method for a LiDAR device 1, as shown in FIG. 1. The LiDAR device 1 includes a laser emission module 10 and a laser receiving module 20, both of which are driven by the corresponding control circuit 30 to perform laser transmission and reception operations. The laser emission module 10 includes a single emission unit or emission units arranged in an array of m1 rows*n1 columns, and the laser receiving module 20 includes receiving units arranged in an array of m2 rows*n2 columns. Here, m1 and n1 are each greater than or equal to 1, m2 and n2 are each greater than or equal to 1, m1 and m2 can be equal or unequal, and similarly, n1 and n2 can be equal or unequal. In an embodiment, the quantity of rows and columns of the emission array and the receiving array can correspond one-to-one. In an embodiment, the quantity of rows in the emission array can be unequal to the quantity of rows in the receiving array, while the quantity of columns is equal, or vice versa.

In an embodiment, the LiDAR device 1 can include scanning components such as rotating mirrors, vibrating mirrors, etc., and the LiDAR device 1 can be a mechanical rotating LiDAR device 1, a turntable drives the emission array and receiving array to perform rotational scanning. In an embodiment, the LiDAR device 1 is a solid-state LiDAR device 1.

In an embodiment, the LiDAR device 1 at least includes one row or one column of receiving units. For example, it includes one emission unit and an array of receiving units. One emission unit emits laser a corresponding number of times, and multiple receiving units simultaneously or according to a preset timing receive the same number of echo laser signals. In an embodiment, the LiDAR device 1 includes array emission units and array receiving units, each emission unit and each receiving unit performing laser transmission and reception in a one-to-one, one-to-many, or many-to-many manner. Therefore, the corresponding relationship between the emission units and receiving units is set according to the structure and requirements of the LiDAR device 1. In an embodiment, in an array-type LiDAR device 1, using array emission devices and array receiving devices without moving parts inside the radar is currently an effective design structure to improve the reliability of the LiDAR device 1.

The laser emission module 10 also includes an emission lens provided for the emission units, which includes one or more lenses. Similarly, the laser receiving module 20 includes a receiving lens provided in the array structure, includes one or more lenses. The laser emission module 10 emits laser to the to-be-measured object 2 with corresponding power and/or frequency under the drive of the control circuit 30. The laser reflects off the to-be-measured object 2 and returns to the laser receiving module 20. The receiving units receive the corresponding echo signals through the receiving lens and convert them into corresponding electrical signals.

Figure 2:
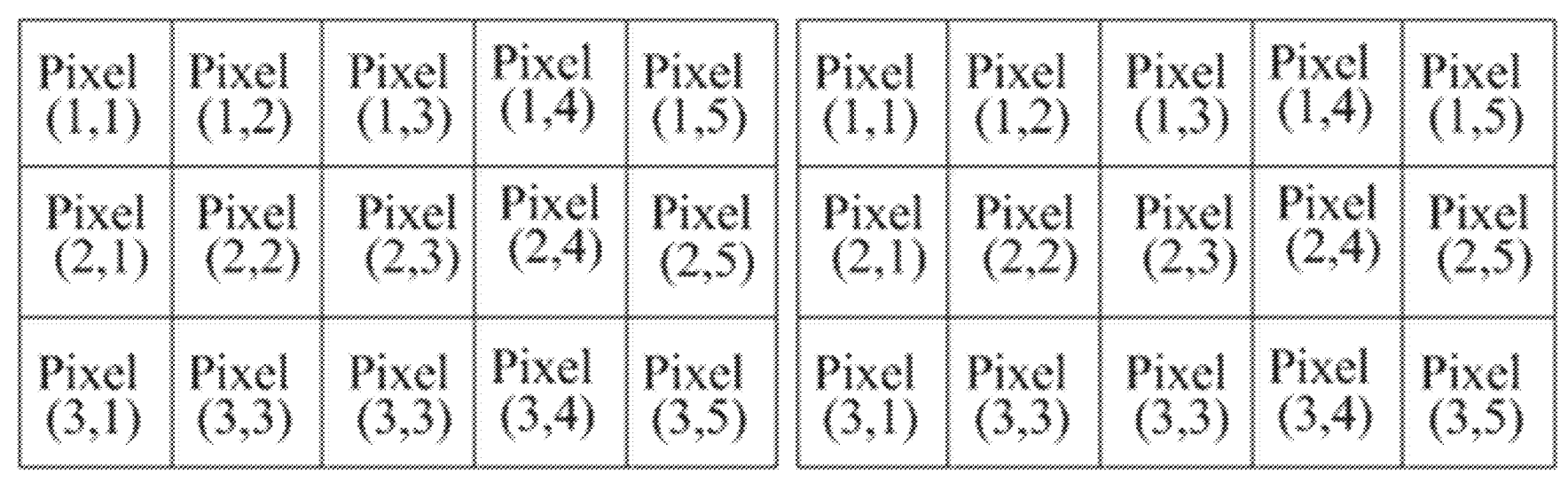
Figure 3:
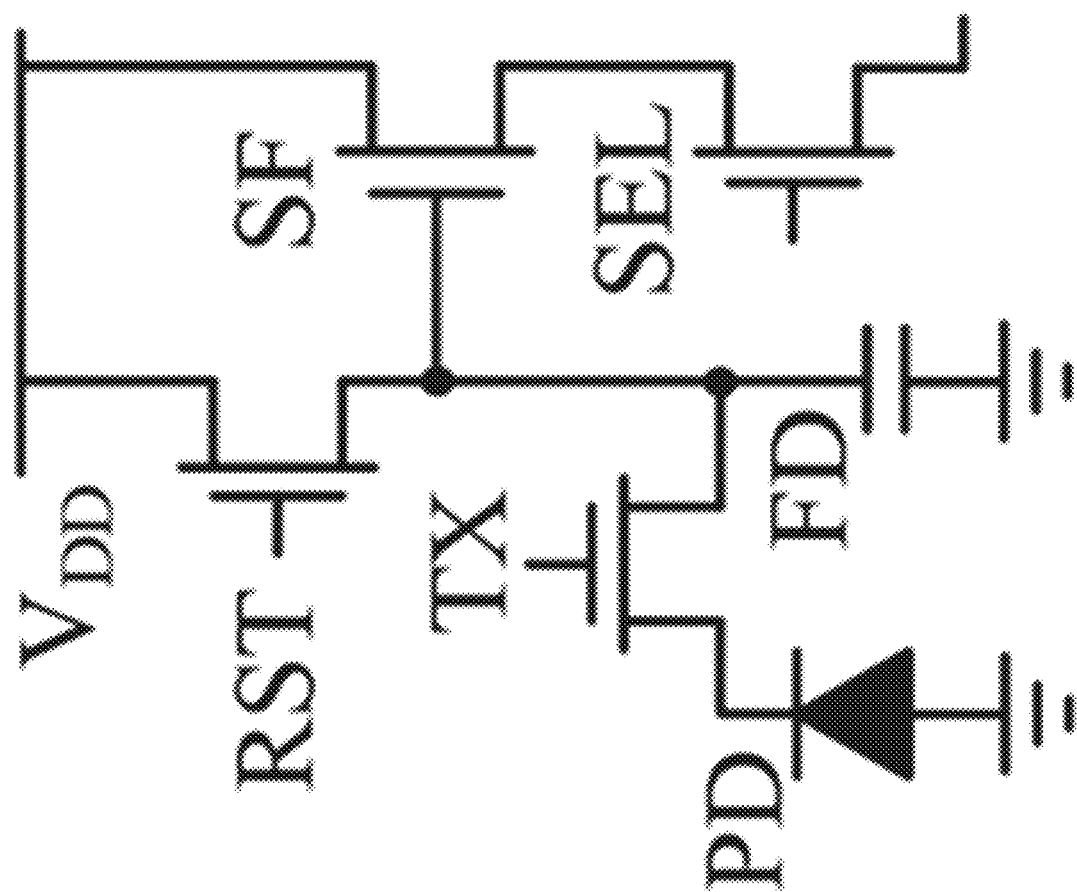
FIG. 3 shows a schematic circuit of the pixels in the receiving unit shown in FIG. 2.

In an embodiment, in the array-type LiDAR device 1, the emission part includes multiple emission units forming an array structure, and the receiving part includes multiple receiving units forming an array structure. The emission lens in the array structure includes one or more lenses, and the receiving lens includes one or more lenses. As shown in FIG. 2, the receiving units include multiple pixels, which can be arranged in an array or other layouts. Pixels include photoelectric conversion elements, including photodiodes such as PIN photodiodes. In an embodiment, pixels include corresponding transistors, such as transfer transistors (TX), reset transistors (RST), source follower transistors (SF), and row select transistors (SEL). The quantity of photoelectric conversion elements, transfer transistors (TX), reset transistors (RST), source follower transistors (SF), and row select transistors (SEL) can be one or more. As shown in FIG. 3, for a basic pixel example, the pixel includes a photodiode (PD), transfer transistor (TX), reset transistor (RST), source follower transistor (SF), and row select transistor (SEL). The cathode of the photodiode (PD) is connected to the first end of the transfer transistor (TX), the second end of the transfer transistor (TX), the first end of the reset transistor (RST), and the controlled end of the source follower transistor (SF) are all coupled to the floating diffusion node. The anode of the photodiode (PD) is grounded. The second end of the reset transistor (RST) and the first end of the source follower transistor (SF) are both connected to the positive power terminal (VDD). The second end of the source follower transistor (SF) is connected to the first end of the row select transistor (SEL). The second end of the row select transistor (SEL) forms the output end of the pixel and is used to output the corresponding electrical signal.

When the laser spot from the emission unit irradiates one of the receiving units, it often causes the pixel at the middle position of the receiving unit to have stronger energy, while the energy at the edge positions is relatively weaker. Weaker energy results in weaker echo signals, reducing the quantity of photons the detector in the receiving unit can receive, thereby weakening the ranging capability. In an embodiment, the ranging capability of the middle position can reach 100 meters, while the edge position can reach 80 meters, resulting in non-uniform ranging and affecting ranging accuracy.

To balance the ranging capability of pixels at different positions within different receiving units and improve ranging accuracy, a ranging adjustment method is disclosed, as shown in FIG. 4. The ranging adjustment method includes the following steps:

Step S10: Calibrating echo intensity at different pixel positions in the receiving unit, and determining a correction coefficient of the pixel at different positions in the receiving unit based on the echo intensity.

In an embodiment, echo intensity at different pixel positions in the receiving unit can be obtained and calibrated through reflective materials or theoretical calculations. In an embodiment, the echo intensity at corresponding positions of pixels Pixel (1,1) to Pixel (3,5) in FIG. 2 is obtained to derive the correction coefficients corresponding to the echo intensity. The correction coefficient is the ratio of the echo intensity to the reference echo intensity of a reference pixel. For example, if pixel (2,2) is the reference pixel with an echo intensity of 1, its correction coefficient is 1. If the echo intensity of pixel (3,2) is 0.7, its correction coefficient is 0.7.

Step S20: When a preset-position receiving unit receives an echo, performing echo intensity correction calculation based on the correction coefficient of the pixel at different positions in the preset-position receiving unit, to obtain correction intensity data corresponding to the pixel at different positions in the preset-position receiving unit.

Step S30: Determining distance information of the to-be-measured object 2 based on the correction intensity data.

In an embodiment, pixels receive optical signals and output electrical signals. The intensity of electrical signals for pixels other than the reference pixel is corrected. Since the light intensity received by each pixel in the same receiving unit is different, the size of the output electrical signal is different, corresponding to the size of the correction coefficient. In an embodiment, if the output electrical signal of the reference pixel is 1 A and the correction coefficient of another pixel A is 0.7, the output electrical signal is 0.7 A. The electrical signal of another pixel A is corrected by dividing the obtained electrical signal by the correction coefficient, i.e., 0.7 A/0.7=1 A, obtaining an electrical signal equal to that of the reference pixel. This results in corrected intensity data for pixels at different positions in the preset-position receiving unit, which is output to the subsequent ranging module. The subsequent ranging module determines the distance information of the to-be-measured object 2 based on the corrected intensity data. Since the echo intensity corresponding to the electrical signal for different pixels at different positions in the same receiving unit is almost the same after correction, ranging accuracy is improved.

In an embodiment, when calibrating the correction coefficients of pixels at different positions in each receiving unit of the laser receiving module 20, when the quantity of pixels in the entire LiDAR device 1 is large, the quantity of correction coefficients obtained is very large, increasing the computational load of the processing unit or causing insufficient storage capacity of the storage unit.

Figure 5:
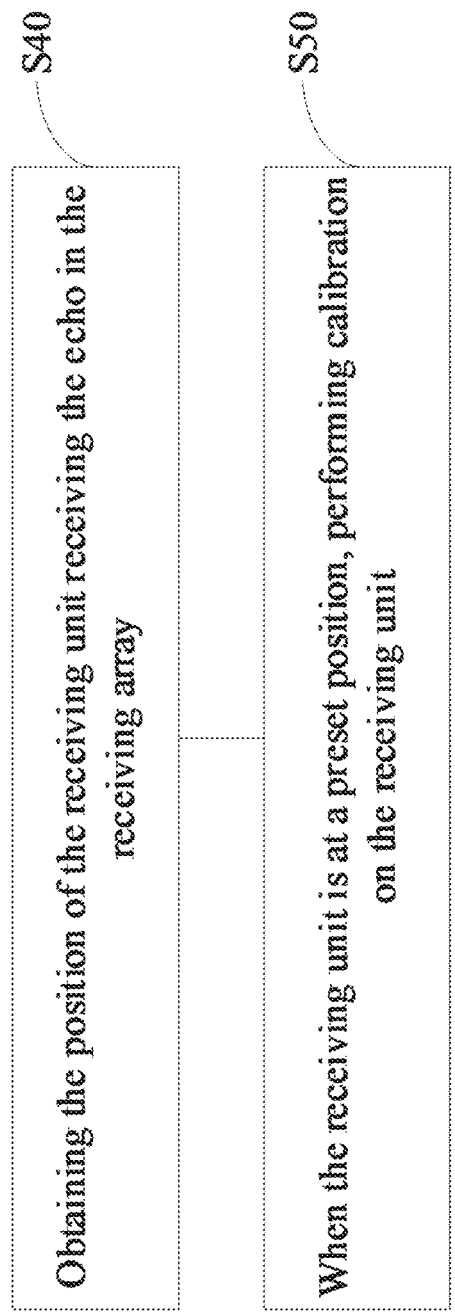
FIG. 5 shows a schematic flow of the second ranging adjustment method for the LiDAR device in accordance with some embodiments of the present application.

In an embodiment, the receiving units at preset positions of the laser receiving module 20 are calibrated and corrected. In an embodiment, the preset positions are calibrated and corrected. In an embodiment, before the calibration, the preset positions of the receiving units to be calibrated are obtained, as shown in FIG. 5. Before step S10, it further includes:

Step S40: Obtaining the position of the receiving unit receiving the echo in the receiving array;

Step S50: When the receiving unit is at a preset position, performing calibration on the receiving unit.

In an embodiment, before calibration and correction, preset position information is set, and the position information of the receiving unit receiving the current echo in the receiving array is obtained. The position information of the receiving unit receiving the current echo is matched with the preset position information. When the information matches, the receiving unit is determined to be at the preset position and is calibrated. If the information does not match, the receiving unit is determined to be at a non-preset position and is not calibrated. In an embodiment, the central field of view area in the receiving array is set as the preset position. Before calibration and correction, it is judged whether each receiving unit in the receiving array is in the central field of view area. When it is determined that the corresponding receiving unit is in the central field of view area, the receiving unit in the central field of view area is calibrated and corrected. When it is determined that the corresponding receiving unit is in a non-central field of view area, such as the edge field of view area, the receiving unit at that position is not calibrated or corrected.

The receiving unit includes multiple receiving pixels. When the receiving unit is at the preset position, the calibration of the receiving unit includes performing echo intensity correction calculation based on the correction coefficient of the pixel at different positions in the preset-position receiving unit to obtain the echo correction data of the pixels at different positions in the preset-position receiving unit.

The central field of view refers to the area where the vertical and horizontal field of view positions are located at the center of the overall field of view in the LiDAR device 1. In an embodiment, if the horizontal detection range of the LiDAR device 1 is (−60° to 60°) and the vertical detection range is (−15° to 15°), the horizontal detection range of the central field of view can be (−30° to 30°), and the vertical detection range can be (−5° to 5°). In an embodiment, if the radar requires high detection accuracy in the area with a horizontal detection range of (−40° to 40°) and a vertical detection range of (−7.5° to 7.5°), the central area can be adjusted to a horizontal range of (−40° to 40°) and a vertical range of (−7.5° to 7.5°).

In an embodiment, the preset position can be the central area of the receiving array of the laser receiving module 20 or the edge area of the receiving array. In an embodiment, the pixels at corresponding positions of multiple receiving units in the central area of the receiving array or the pixels at corresponding positions of receiving units in the edge area of the receiving array are corrected, thus reducing the computation of correction coefficients, reducing the computational load on the processing unit, and reducing the storage capacity of the storage unit.

In an embodiment, the preset position can be based on the time the receiving unit receives the echo. When the receiving unit receives the echo time less than a preset value, the echo intensity of the receiving unit is corrected. When the receiving unit receives the echo time greater than a preset value, the echo intensity of the receiving unit is not corrected. When the echo reception time of the receiving unit is less than the preset value, it indicates that the detected object is closer to the radar, thus requiring higher detection accuracy. When the echo reception time of the receiving unit is greater than the preset value, it indicates that the detected object is farther from the radar, and the echo intensity of the receiving unit is not corrected. That is, the position of the detected object is determined to be within the preset distance range based on the received echo time. When within the preset distance range, the echo intensity of the receiving unit is corrected, further improving the detection accuracy of the receiving units within the detection range.

In an embodiment, step S10 includes:

Step S11: performing multiple calibrations on echo intensity at different pixel positions in the preset-position receiving unit using reflectors with different calibration reflectivity, to obtain correction coefficients of the pixel at different positions in the preset-position receiving unit under different reflectivity;

Step S12: performing linear interpolation calculation on the correction coefficients of the pixel at different positions under different reflectivity, to obtain the actual correction coefficient of the pixel at different positions in the preset-position receiving unit under different reflectivity.

In an embodiment, the reflective material can be a corresponding reflective material such as reflective film or reflective cloth, with a corresponding reflectivity such as 10%, 40%, and 80%.

After one scan, different reflective materials with different reflectivity are set multiple times on the preset-position receiving unit. After receiving the laser pulse signal output by the laser emission module 10, the reflective material with different reflectivity reflects the original laser pulse signal at the corresponding reflectivity and reflects it to the corresponding light intensity detection module, thereby obtaining the echo intensity of different pixel positions at different reflectivity in the preset-position receiving unit. For example, the echo intensity at corresponding positions of pixels Pixel (1,1) to Pixel (3,5) in FIG. 2 is obtained, resulting in multiple sets of correction coefficients corresponding to multiple sets of echo intensity. In an embodiment, using reflective materials with reflectivity of 10%, 40%, and 90%, the echo intensity and corresponding correction coefficients of different pixel positions at different reflectivity are obtained. When calculating the correction coefficients corresponding to the intensity correction, linear interpolation is performed based on the range of actual echo intensity to calculate the actual correction coefficients.

Figure 7:
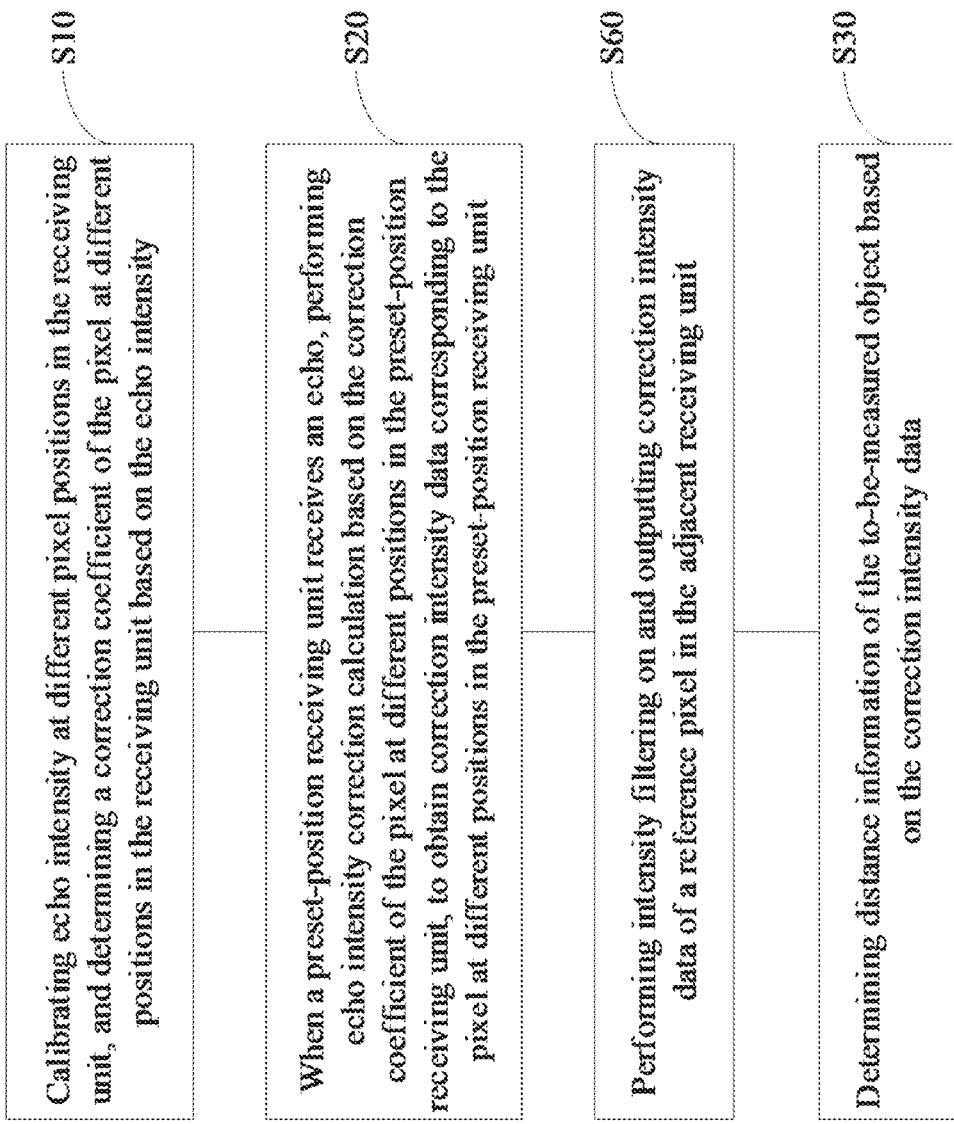
FIG. 7 shows a schematic flow of the third ranging adjustment method for the LiDAR device in accordance with some embodiments of the present application.

In an embodiment, the correction coefficients for intensity calculations can be obtained through theoretical simulations or calibration methods. In an embodiment, all receiving units are calibrated using the center area of the receiving unit as the reference, and the edge areas are corrected based on the correction coefficients of the receiving unit itself. Since there will always be minor deviations in the calibration of different receiving units' center areas, minor deviations in the correction coefficients of different receiving units will still exist. To reduce the deviation of the correction coefficients of different receiving units, the light intensity received is filtered according to the size of the filter window for each pixel. As shown in FIG. 7, in an embodiment, step S20 further includes:

Step S60: Performing intensity filtering on and outputting correction intensity data of a reference pixel in each of the adjacent receiving units, and determining the distance information of the to-be-measured object 2 based on the correction echo intensity data after filtering.

In an embodiment, when determining the echo intensity and correction coefficient of the preset-position receiving unit using reflective materials with the same reflectivity, the center position pixel in the receiving unit is used as the reference pixel. A size of the reference coefficient of the reference pixel corresponding to different positions of the receiving unit may differ due to different positions. In an embodiment, as shown in FIG. 2, the correction coefficient of the central pixel Pixel (2,3) of the left receiving unit is 1, and the correction coefficient of the central pixel Pixel (2,3) of the right receiving unit is 1.4. To ensure detection accuracy, the difference in echo intensity between the reference pixels (central pixels) of adjacent receiving units must be within a preset range. Therefore, after performing intensity correction calculation on the correction coefficients of pixels with different reference coefficients, intensity filtering is performed.

In an embodiment, the reference coefficient of the central pixel Pixel (2,3) of the left receiving unit is 1, and the reference coefficient of the central pixel Pixel (2,3) of the right receiving unit is 1.4. Under the same intensity of the laser spot, the echo intensity is the same, but due to different reference coefficients, the generated electrical signal size is different. In some embodiments, the correction coefficient of the pixel Pixel (2,5) of the left receiving unit is 0.5, and the correction coefficient of the pixel Pixel (2,5) of the right receiving unit is 0.7. Under the same intensity of the laser spot, the echo intensity is the same, but due to different correction coefficients, the generated electrical signal size is different.

To make the correction intensity data of the same position of adjacent receiving units consistent, the correction intensity data of the reference pixel of the same position in adjacent receiving units is filtered and output. In an embodiment, the output electrical signal of the central pixel Pixel (2,3) of the left receiving unit and the central pixel Pixel (2,3) of the right receiving unit are filtered to make their electrical signals almost consistent. The output electrical signal of the pixel Pixel (2,5) of the left receiving unit and the pixel Pixel (2,5) of the right receiving unit are filtered to make the correction intensity data of pixels with different correction coefficients consistent, improving ranging accuracy.

Figure 8:
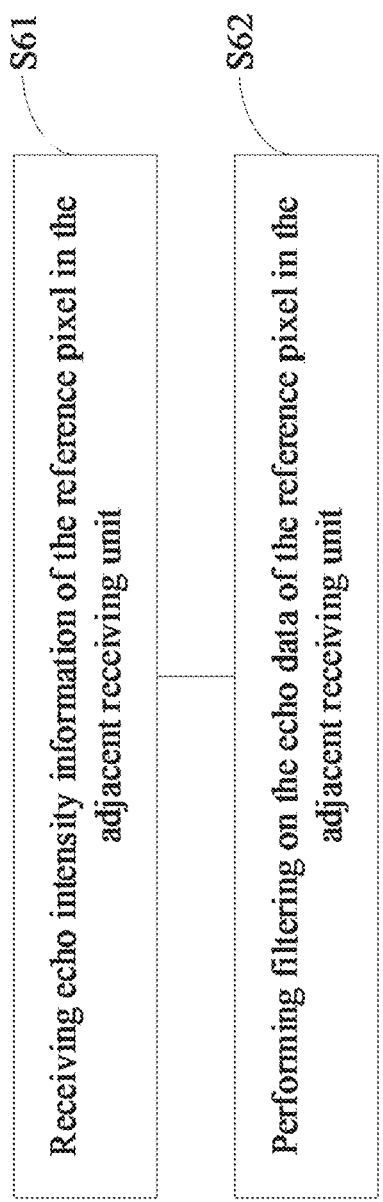
FIG. 8 shows a flowchart of step S40 in the ranging adjustment method shown in FIG. 7.

A sliding window filter is used to select the pixels at corresponding positions for filtering. As shown in FIG. 8, step S60 includes:

Step S61: receiving echo intensity information of the reference pixel in each of the adjacent receiving units;

Step S62: performing filtering on the echo data of the reference pixel in each of the adjacent receiving units.

Figure 9:
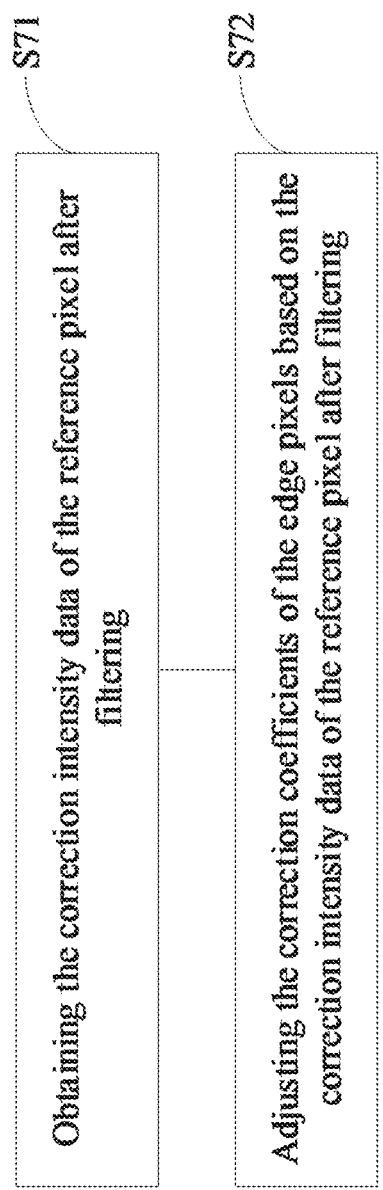
FIG. 9 shows another flowchart of step S40 in the ranging adjustment method shown in FIG. 7.

As shown in FIG. 9, step S60 includes:

Step S71: obtaining the correction intensity data of the reference pixel after filtering;

Step S72: adjusting the correction coefficients of the edge pixels based on the correction intensity data of the reference pixel after filtering.

In an embodiment, the correction coefficients of the edge pixels are adjusted based on the filtered correction intensity data of the reference pixel, ensuring that the edge pixels of adjacent receiving units have consistent correction intensity data, improving ranging accuracy.

Figure 10:
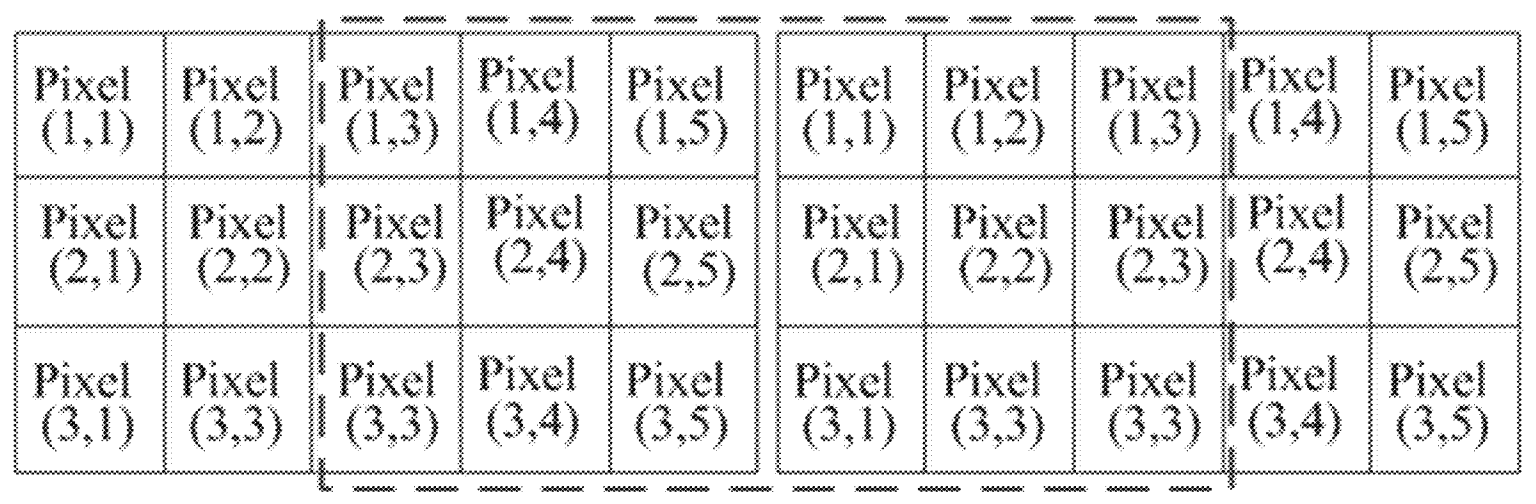

The range of the sliding window filter, the combination range of pixel positions to be filtered, can select the overall range of two adjacent pixels or partially. In an embodiment, as shown in FIG. 10, the edge pixels include:

Multiple columns or rows of pixels between the central areas of two adjacent receiving units. The size of the filter window is related to the pixel position size, and the filter window covers the central area of the pixels of two adjacent receiving units, but not exceed two receiving units.

The serial numbers of the steps in the above embodiments do not imply the execution order, and the execution order of each process should be determined based on its function and inherent logic.

The ranging adjustment method of the above LiDAR device 1 first uses reflective materials with calibration reflectivity to calibrate the echo intensity at different pixel positions in the preset-position receiving unit and the corresponding correction coefficients, and then corrects the intensity data output by pixels at different positions based on the correction coefficients, the intensity data output by the corresponding pixels of the same receiving unit is consistent, and the distance information of the to-be-measured object 2 is determined based on the corrected intensity data, improving ranging accuracy.

Figure 11:
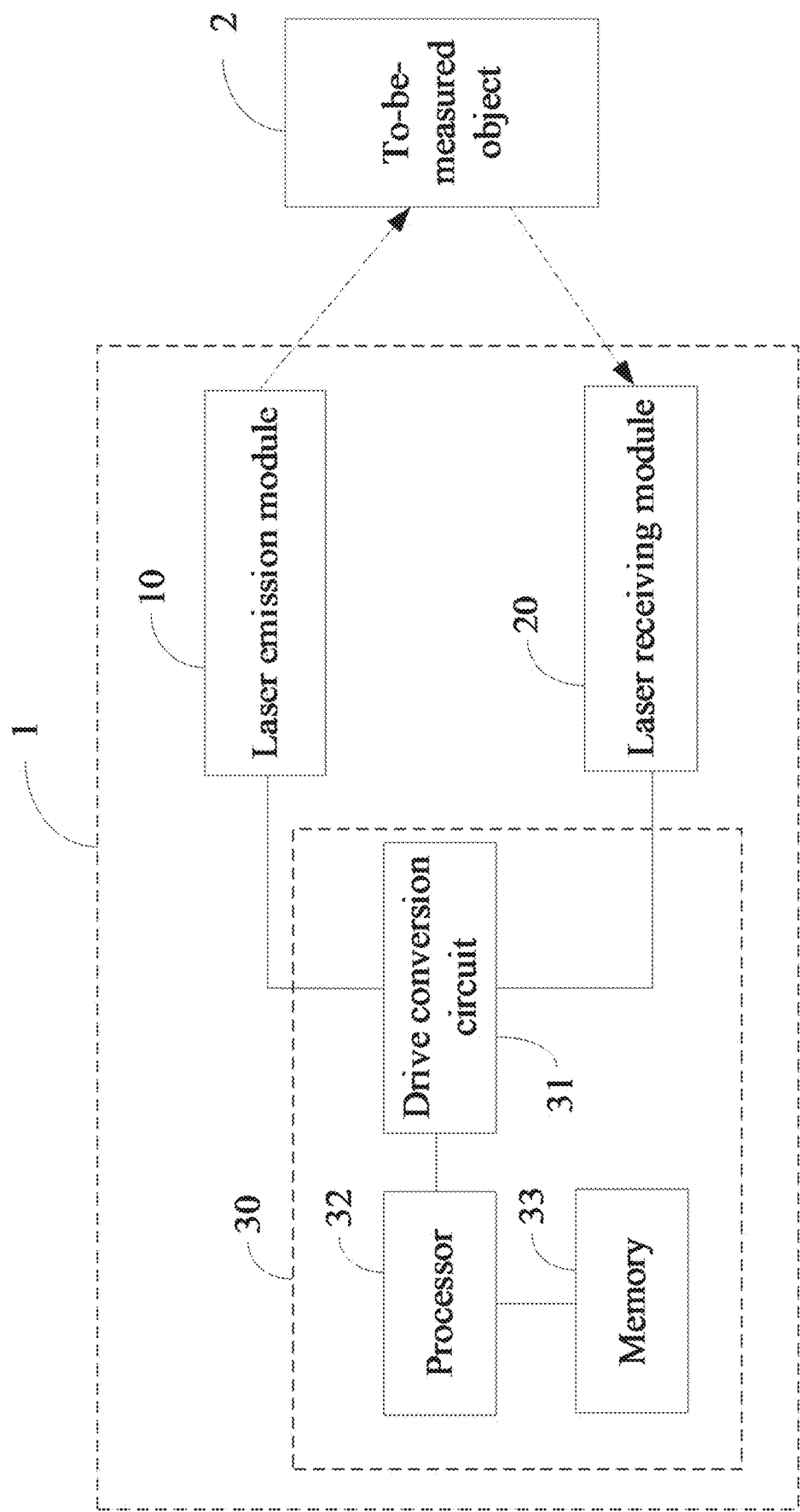
FIG. 11 shows a schematic structure of the second type of LiDAR device in accordance with some embodiments of the present application.

A second aspect of the embodiments of the present application provides a LiDAR device 1, as shown in FIG. 11. The LiDAR device 1 includes a laser emission module 10, a laser receiving module 20, and a control circuit 30 connected to the laser emission module 10 and the laser receiving module 20. The control circuit 30 includes a drive conversion circuit 31, a memory 33, a processor 32, and a computer program stored in the memory 33 and executable on the processor 32. When the processor 32 executes the computer program, it controls the drive conversion circuit 31 to implement the steps of the ranging adjustment method of the LiDAR device 1 described above; and the laser receiving module 20 includes a plurality of receiving units arranged in an array.

In an embodiment, the laser emission module 10 includes a single emission unit or emission units arranged in an array of m1 rows*n1 columns, and the laser receiving module 20 includes receiving units arranged in an array of m2 rows*n2 columns, where m1 and n1 are each greater than or equal to 1, m2 and n2 are each greater than or equal to 1, m1 and m2 can be equal or unequal, and similarly, n1 and n2 can be equal or unequal. In an embodiment, the quantity of rows and columns of the emission array and the receiving array can correspond one-to-one. In an embodiment, the quantity of rows in the emission array can be unequal to the quantity of rows in the receiving array, while the quantity of columns is equal, or vice versa.

The LiDAR device 1 can include scanning components such as rotating mirrors, vibrating mirrors, etc., and the LiDAR device 1 can be a mechanical rotating LiDAR device 1, a turntable drives the emission array and receiving array to perform rotational scanning.

The laser emission module 10 includes an emission lens provided for the emission units, which includes one or more lenses. In an embodiment, the laser receiving module 20 includes a receiving lens provided in the array structure, includes one or more lenses. The laser emission module 10 emits laser to the to-be-measured object 2 with corresponding power and/or frequency under the drive of the control circuit 30. The laser reflects off the to-be-measured object 2 and returns to the laser receiving module 20. The receiving units receive the corresponding echo signals through the receiving lens and convert them into corresponding electrical signals.

In an embodiment, an array-type LiDAR device 1 includes multiple emission units forming an array structure, and the receiving part includes multiple receiving units forming an array structure. The emission lens in the array structure include one or more lenses, and the receiving lens include one or more lenses. As shown in FIG. 2, the receiving units include multiple pixels arranged in an array. Pixels include photoelectric conversion elements, including photodiodes such as PIN photodiodes. In an embodiment, pixels can include corresponding transistors, such as transfer transistors (TX), reset transistors (RST), source follower transistors (SF), and row select transistors (SEL). The number of photoelectric conversion elements, transfer transistors (TX), reset transistors (RST), source follower transistors (SF), and row select transistors (SEL) can be one or more. As shown in FIG. 3, for a basic pixel example, the pixel includes a photodiode (PD), transfer transistor (TX), reset transistor (RST), source follower transistor (SF), and row select transistor (SEL). The cathode of the photodiode (PD) is connected to the first end of the transfer transistor (TX), the second end of the transfer transistor (TX), the first end of the reset transistor (RST), and the controlled end of the source follower transistor (SF) are all coupled to the floating diffusion node. The anode of the photodiode (PD) is grounded. The second end of the reset transistor (RST) and the first end of the source follower transistor (SF) are both connected to the positive power terminal (VDD). The second end of the source follower transistor (SF) is connected to the first end of the row select transistor (SEL). The second end of the row select transistor (SEL) forms the output end of the pixel and is used to output the corresponding electrical signal.

To balance the ranging capability of pixels at different positions within different receiving units and improve ranging accuracy, the processor 32 controls the drive conversion circuit 31 to implement the ranging adjustment method of the LiDAR device 1 as described above. After one scan, reflective material is set on the preset-position receiving unit. After receiving the laser pulse signal output by the laser emission module 10, the reflective material with different reflectivity reflects the original laser pulse signal at the corresponding reflectivity and reflects it to the corresponding light intensity detection module, thereby obtaining the echo intensity of different pixel positions at different reflectivity in the preset-position receiving unit. In an embodiment, the echo intensity at corresponding positions of pixels Pixel (1,1) to Pixel (3,5) in the figure is obtained, resulting in multiple sets of correction coefficients corresponding to multiple sets of echo intensity. The correction coefficient is the ratio of the echo intensity to the reference echo intensity of a reference pixel. In an embodiment, if pixel (2,2) is the reference pixel with an echo intensity of 1, its correction coefficient is 1. If the echo intensity of pixel (3,2) is 0.7, its correction coefficient is 0.7.

Pixels receive optical signals and output electrical signals, the intensity of electrical signals for pixels other than the reference pixel is corrected. Since the light intensity received by each pixel in the same receiving unit is different, the size of the output electrical signal is different, corresponding to the size of the correction coefficient. In an embodiment, if the output electrical signal of the reference pixel is 1 A and the correction coefficient of another pixel A is 0.7, the output electrical signal is 0.7 A. The electrical signal of another pixel A is corrected by dividing the obtained electrical signal by the correction coefficient, 0.7 A/0.7=1 A, obtaining an electrical signal equal to that of the reference pixel. This results in corrected intensity data for pixels at different positions in the preset-position receiving unit, which is output to the subsequent ranging module. The subsequent ranging module determines the distance information of the to-be-measured object 2 based on the corrected intensity data. Since the echo intensity corresponding to the electrical signal for different pixels at different positions in the same receiving unit is almost the same after correction, ranging accuracy is improved.

The emission unit includes a laser, such as a gas laser, solid-state laser, or semiconductor laser. The laser is driven to emit laser by the drive conversion circuit 31. The laser emission module 10 also includes an emission lens provided for the laser, which is set for one or more lasers. The receiving unit includes an array of pixels, and the laser receiving module 20 includes at least one receiving lens provided for the array of pixels. Pixels convert the reflected echo laser signal into corresponding electrical signal types of echo pulse signals and output them to the processor 32 through the drive conversion circuit 31 for determining correction coefficients, corrected intensity data, and distance information of the to-be-measured object 2.

Pixels can use corresponding photoelectric structures. In an embodiment, the pixel includes a photodiode, which completes photoelectric conversion. The photodiode can be any type selected from Si photodiodes, avalanche photodiodes, PIN photodiodes, Schottky barrier photodiodes, HgCdTe photovoltaic diodes, etc., depending on the requirements of the LiDAR device 1. In an embodiment, the photodiode is a Single Photon Avalanche Diode (SPAD).

Figure 12:
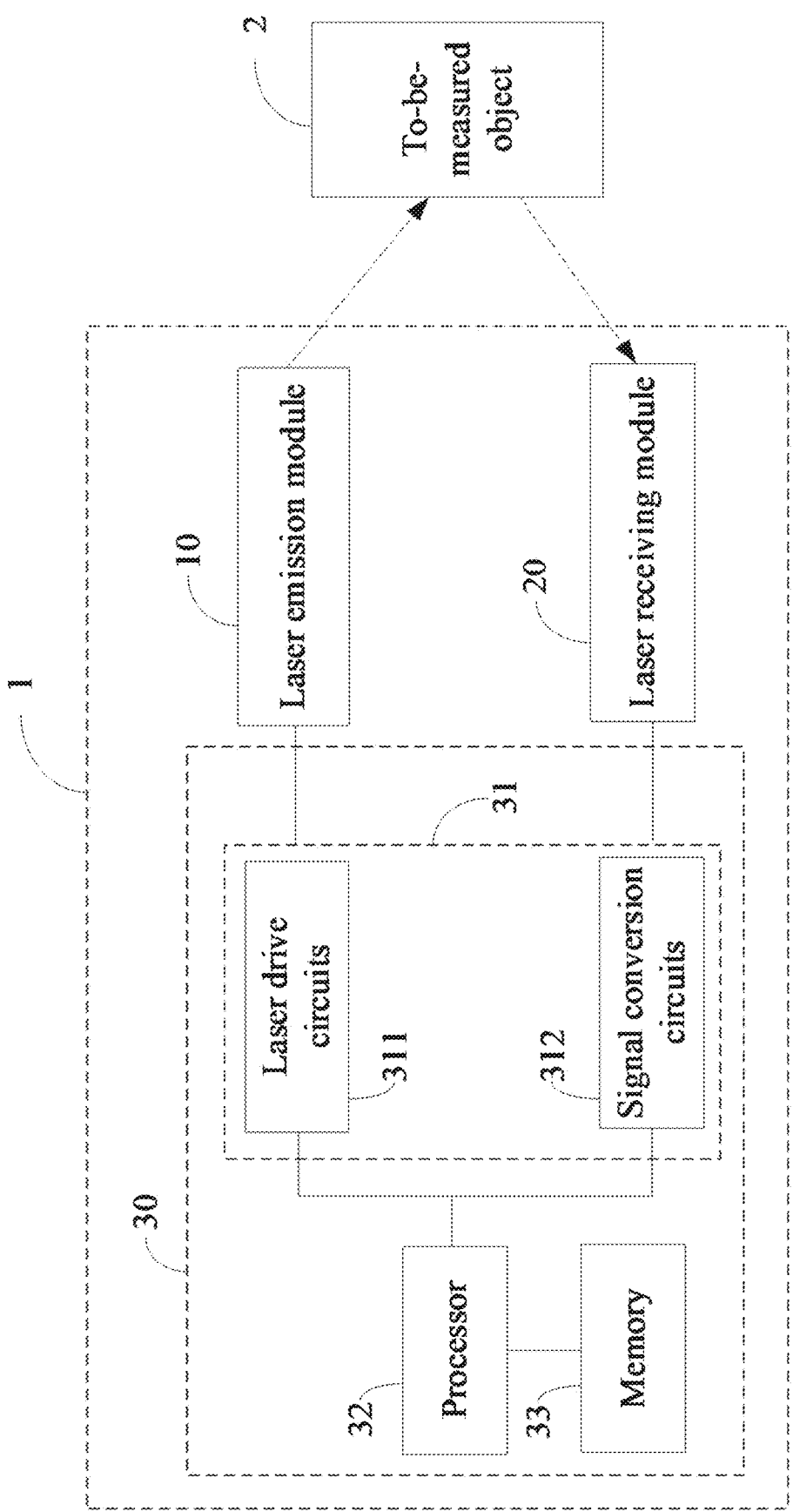
FIG. 12 shows a schematic structure of the third type of LiDAR device in accordance with some embodiments of the present application.

The drive conversion circuit 31 is used to drive the emission unit and the signal conversion of the receiving unit. Corresponding laser drive circuits and signal processing circuits such as charge-discharge circuits, amplifiers, etc., are used. As shown in FIG. 12, in an embodiment, the drive conversion circuit 31 includes: laser drive circuits 311 connected to the processor 32 and the laser emission module 10, respectively. The laser drive circuits 311 are turned on or off according to a control signal output by the processor 32, and adjust the number of times of laser emission and/or emission power of the emission unit in a frame of a scanning image;

Signal conversion circuits 312 connected to the laser receiving module 20 and the processor 32, respectively. The signal conversion circuits 312 convert the current signal output by the receiving unit into corresponding echo pulse signals and output the echo pulse signals to the processor.

The laser drive circuits 311 are driven by the drive control signal output by the processor 32 to operate the laser. The laser emits laser at preset power and corresponding emission times, allowing the receiving unit to receive the corresponding echo laser signal multiple times. Meanwhile, when receiving the echo laser signal, the pixels and signal conversion circuits 312 sequentially convert the optical signal to a current signal and the current signal to a voltage signal, perform correction coefficient correction and filtering work, and output multiple echo pulse signals to the processor 32. The processor 32 determines the distance information of the to-be-measured object 2 based on multiple echo pulse signals.

The laser drive circuits 311 can use corresponding charge-discharge circuits connected to the laser to drive multiple charge-discharge. The signal conversion circuits 312 can use transconductance amplifiers, detector circuits, etc., to complete the electrical signal conversion and echo signal detection, and output multiple echo pulse signals to the processor 32. The processor 32 obtains corresponding histogram data from multiple echo pulse signals to achieve the purpose of ranging the to-be-measured object 2.

What is claimed is:

1. A ranging adjustment method for a LiDAR device, the LiDAR device comprising a laser emission module and a laser receiving module, the laser receiving module comprising a plurality of receiving units arranged in an array, and each receiving unit comprising a plurality of pixels, wherein the laser emission module is configured to emit a laser to a to-be-measured object, the laser is reflected by the to-be-measured object to form an echo, and the laser receiving module is configured to receive the echo, the method comprising:
    calibrating echo intensities at different pixel positions in a receiving unit, and determining correction coefficients of the pixels at different positions in the receiving unit based on the echo intensities;
    when a preset-position receiving unit receives the echo, performing echo intensity correction calculation based on the correction coefficients of the pixels at different positions in the preset-position receiving unit, to obtain correction intensity data corresponding to the pixels at different positions in the preset-position receiving unit, wherein a light intensity received by each pixel of a same receiving unit is different;
    performing intensity filtering on the correction intensity data of a reference pixels in two adjacent receiving units, and obtaining the correction intensity data of each reference pixel after filtering, wherein each reference pixel is a pixel at the center position of each receiving unit; and
    adjusting correction coefficient of edge pixels based on the correction intensity data of each reference pixel after filtering, determining distance information of the to-be-measured object based on the correction intensity data after filtering, wherein the edge pixels comprise multiple columns or rows of pixels between the central areas of the two adjacent receiving units.

2. The ranging adjustment method according to claim 1, before calibrating echo intensities at different pixel positions in the receiving unit, and determining the correction coefficients of the pixels at different positions in the receiving unit based on the echo intensities, the method further comprising:
    obtaining a position of the receiving unit receiving the echo within the array; and
    when the receiving unit is at a preset position, performing calibration on the receiving unit.

3. The ranging adjustment method according to claim 2, wherein calibrating the echo intensities at different pixel positions in the receiving unit and determining the correction coefficients of the pixels at different positions in the receiving unit based on the echo intensities comprises:
    performing multiple calibrations on echo intensities at different pixel positions in the preset-position receiving unit using reflectors with different calibration reflectivity, to obtain different correction coefficients of the pixels at the different positions in the preset-position receiving unit under the different reflectivity; and
    performing linear interpolation calculation on the correction coefficients of the pixels at the different positions under the different reflectivity, to obtain actual correction coefficients of the pixels at the different positions in the preset-position receiving unit under the different reflectivity.

4. The ranging adjustment method according to claim 1, wherein the performing intensity filtering on the correction intensity data of the reference pixels in the two adjacent receiving units comprises:
  receiving echo intensity information of each reference pixel; and
  performing filtering on echo data of each reference pixel.

5. A LiDAR device, comprising a laser emission module, a laser receiving module, and a control circuit connected to the laser emission module and the laser receiving module, wherein the control circuit comprises a drive conversion circuit, a memory, a processor, and a computer program stored in the memory and executable on the processor, and the processor performs steps of the ranging adjustment method according to claim 1 when driving the drive conversion circuit;
  wherein the laser receiving module comprises a plurality of receiving units arranged in an array, and the laser emission module comprises a single emission unit or a plurality of emission units arranged in an array.

6. The LiDAR device according to claim 5, wherein the emission unit comprises a laser, and the laser emission module further comprises an emission lens provided corresponding to the laser; wherein each receiving unit comprises a plurality of pixels arranged in an array, and the laser receiving module further comprises at least one receiving lens provided corresponding to the array of pixels.

7. The LiDAR device according to claim 5, wherein the drive conversion circuit comprises:
  laser drive circuits, connected to the processor and the laser emission module respectively, wherein the laser drive circuits are configured to be turned on or off according to a control signal output by the processor, and to adjust a number of times of laser emission or emission power of the emission unit in a frame of a scanning image; and
  a signal conversion circuit, connected to the laser receiving module and the processor respectively, wherein the signal conversion circuit is configured to convert a current signal output by the plurality of receiving units into a corresponding echo pulse signal, and to output the echo pulse signal to the processor.

8. The LiDAR device according to claim 6, wherein the pixel comprises a photoelectric conversion diode.

* * * * *